United States Patent [19]

Kurita

[11] 4,060,095
[45] Nov. 29, 1977

[54] THERMOCOUPLE PROTECTING TUBE

[75] Inventor: Sumihiko Kurita, Arita, Japan

[73] Assignee: Koransha Co., Ltd., Japan

[21] Appl. No.: 715,023

[22] Filed: Aug. 17, 1976

[30] Foreign Application Priority Data

Aug. 23, 1975 Japan .............................. 50-116346[U]
Sept. 1, 1975 Japan .............................. 50-106144[U]
Feb. 10, 1976 Japan .................................. 51-13800
Feb. 10, 1976 Japan .............................. 51-14939[U]
Feb. 12, 1976 Japan .............................. 51-15519[U]

[51] Int. Cl.² .......................................... H01L 35/02
[52] U.S. Cl. .............................. 136/234; 73/DIG. 9;
136/232; 136/242
[58] Field of Search ............... 136/234, 242, 230, 231,
136/232; 73/DIG. 9

[56] References Cited

U.S. PATENT DOCUMENTS

| 1,773,826 | 8/1930 | Simms | 136/242 |
| 2,343,242 | 3/1944 | Richmond | 136/242 |
| 2,384,024 | 9/1945 | Goller | 136/232 |
| 2,906,800 | 9/1959 | Darken | 136/230 X |
| 2,948,766 | 8/1960 | Schneider et al. | 136/232 |
| 3,398,027 | 8/1968 | Lajarrige et al. | 136/234 |
| 3,647,558 | 3/1972 | McMurtry | 136/234 |

Primary Examiner—Maynard R. Wilbur
Assistant Examiner—Richard E. Berger
Attorney, Agent, or Firm—Frank J. Jordan

[57] ABSTRACT

A thermocouple protecting tube substantially has a duplicate tube construction wherein the inner ceramic protecting tube which contains a thermocouple element is concentrically enclosed by an outer protecting pipe which is of high thermal shock resistance.

5 Claims, 11 Drawing Figures

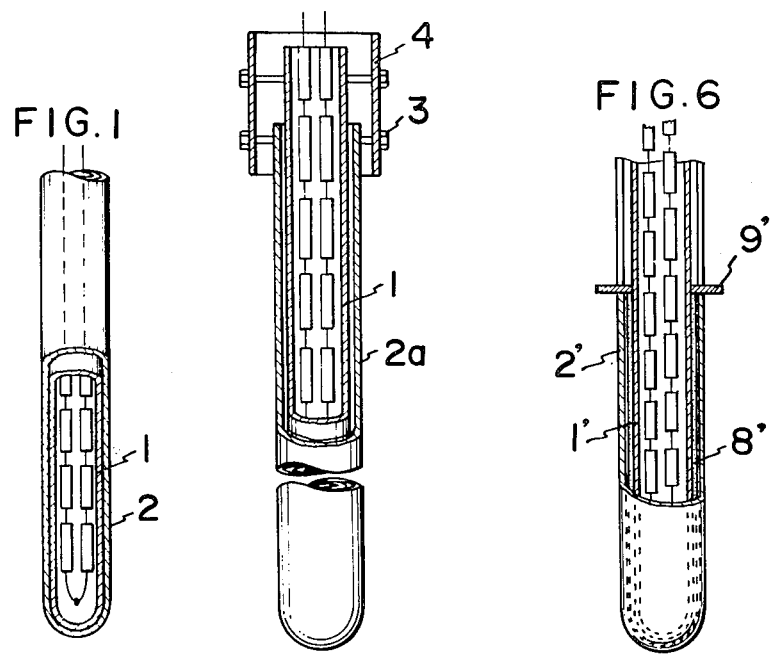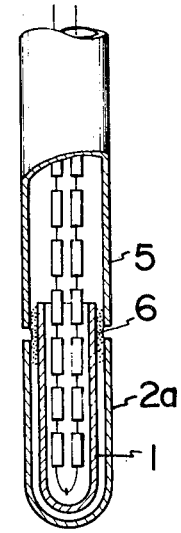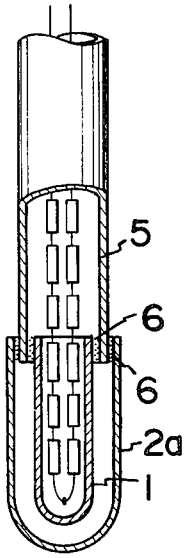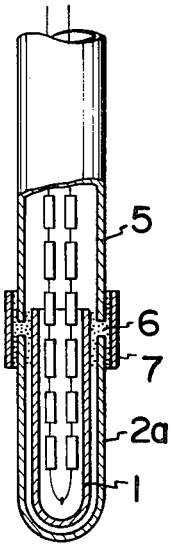

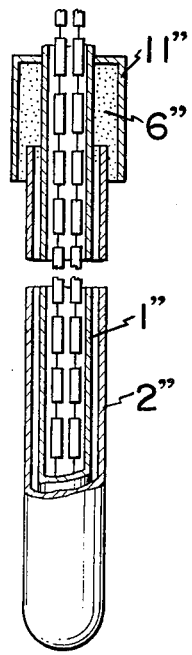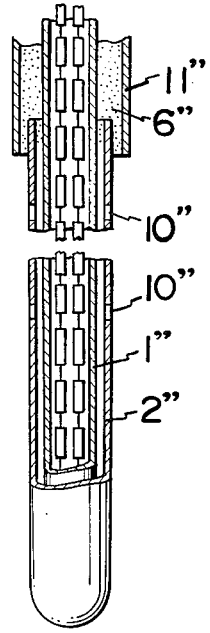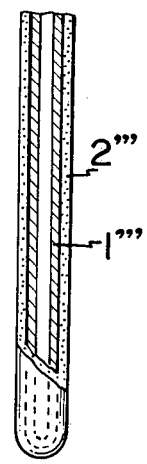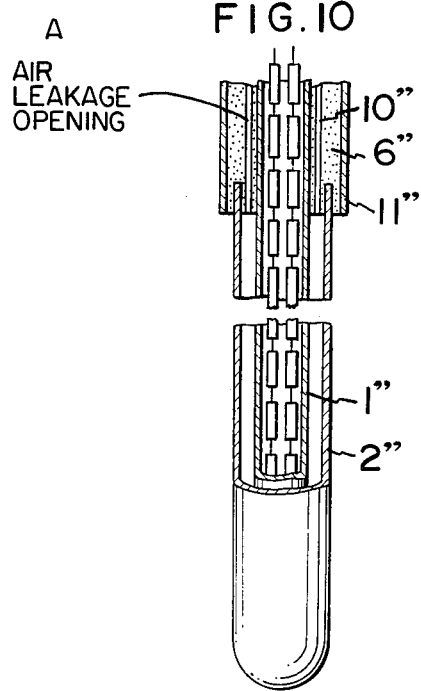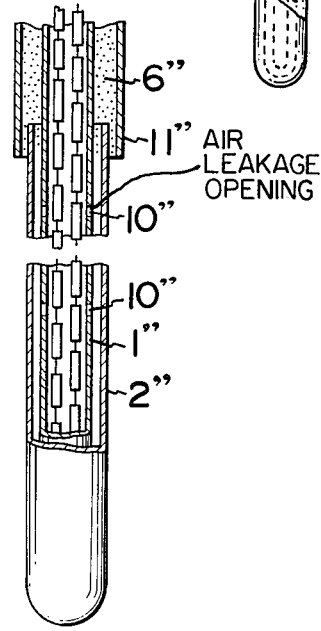

THERMOCOUPLE PROTECTING TUBE

BACKGROUND OF THE INVENTION

This invention relates to a thermocouple protecting tube which can withstand the temperature measuring operation within molten metal for many hours resulting in the continuous measuring of the temperature of molten metal with high precision.

With the increase of continuous casting facilities in steel making plants, the continuous measuring of the temperature of molten metal has become a matter of vital importance.

The purpose for the above continuous measuring, which may vary depending on each steel making plant, can be summarized in view of two aspects, namely, quality control and the lowering of production costs.

Regarding quality control, continuous measuring is effective in the production of metal having a uniform quality and in the prevention of segregation within the metal. Furthermore, continuous measuring facilitates the refining operation since the temperature of molten metal can be continuously measured.

Regarding the lowering of production costs, continous measuring enables the complete computarization of the control of the refining operation and also improves the drawing speed of the continuous casting operation.

Conventionally, for measuring the temperature of molten steel, ceramic-made thermocouple protecting tubes, especially alumina protecting tubes, have been predominantly used.

However, when the alumina-made protecting tubes are directly immersed into a heat-molten body from an atmosphere of ordinary temperature, almost all the tubes rupture due to thermal shock which is caused by the rapid heating thereof, regardless of the size or shape of the protecting tubes.

For preventing the above mentioned rupture of the tubes, the protecting tubes are preheated by burners or by placing them over the heat molten body for a predetermined period of time whereby the operation becomes very laborious and time consuming. Although silicon nitride, aluminum nitride and silica glass can be considered as materials which have strong thermal-shock resistance, the first two materials are nitrides so that the oxidation thereof proceeds in open air places such as ordinary steel refining plants or glass producing plants and therefore they are not suitable as material for such a tube (the oxidation, however, does not occur in a vacuum or reduction atmosphere) and in general they are expensive. As for the third material, silica glass, strongly resists thermal shock, but it reacts easily with the platinum element of the thermocouple at high temperatures so that a temperature measurement of high precision is difficult and furthermore, due to the nature of silica glass, it easily reacts with molten metal or molten slag within a vessel whereby it can not withstand long usage thereof.

Of course, if the thickness of the protecting tube is considerably thicker than the usual thickness, the tube can withstand temperature and the long usage thereof. However, excessive thickness of the protecting tube also causes errors in measuring the temperature.

As another method for preventing the above rupture of tubes, a refractory powder coating is formed around the outer periphery of a thermocouple protecting tube to prevent the protecting tube from thermal shock. However, the above refractory powder coating is not sufficient for the above purpose and in addition it could happen that the protecting tube might break off during the transportation thereof.

Accordingly, it an object of the present invention to provide thermocouple protecting tubes which overcome the above mentioned problems and enable the continuous temperature measurement of molten metal.

It is another object of the present invention to provide a thermocouple protecting tube which is constructed such that the ceramic tube which includes a thermocouple element is concentrically disposed within an outer protecting tube which can withstand thermal shock which occurs when the protecting tube is immersed into molten metal.

It is still another object of the present invention to provide a thermocouple protecting tube which is constructed such that a ceramic tube which has on the outer periphery thereof, a refactory powder coated layer is disposed within a metal tube concentrically.

It is a further object of the present invention to provide a thermocouple protecting tube which is constructed such that a silica glass layer or a silica glass tube, which is of high thermal shock resistance, is formed around a ceramic tube.

These and other objects of the invention will become more apparent in the detailed description and examples as follow:

BRIEF DESCRIPTION OF THE DRAWINGS

FIG. 1 is a front view with a part broken away of a thermocouple protecting tube of the first embodiment of this invention.

FIG. 2 is a front view with a part broken away of a modification of the above thermocouple protecting tube.

FIG. 3 through FIG. 5 are cross-sectional front views of other modifications of the above thermocouple protecting tube.

FIG. 6 is a front view with a part broken away of a thermocouple protecting tube of the second embodiment of this invention.

FIG. 7 is a front view with a part broken away described for comparison with the following FIG. 8 through FIG. 10.

FIG. 8 through FIG. 10 are cross-sectional front views of a thermocouple protecting tube of the third embodiment.

FIG. 11 is a front view with a part broken away of a thermocouple protecting tube of the fourth embodiment.

DETAILED DESCRIPTION OF THE INVENTION

The thermocouple protecting tubes of this invention are described in great detail in the following embodiments.

FIRST EMBODIMENT

This embodiment relates to a metal oxide thermocouple protecting tube which is provided with a means which prevents the protecting tube from thermal shock caused at the time of immersing the tube into molten metal.

The thermocouple protecting tube is characterized in that a silica glass layer or silica glass tube is formed around the ceramic tube.

In the drawings, FIG. 1 and FIG. 2, numeral 1 indicates a ceramic tube which is made of alumina, beryllia, magnesia or alumina spinel, numeral 2 indicates a silica glass layer and numeral 2a indicates a silica glass tube.

In FIG. 2 the silica glass tube 2a is connected to ceramic tube 1 by bolt means 3 and a supporting means 4.

In this embodiment, the silica glass which has a low heat expansion rate, and which never ruptures even by thermal shock, which occurs when the tube is directly immersed into molten metal, and which can withstand high temperatures until it melts away, is disposed around the ceramic protecting tube 1. When the thermocouple protecting tube is immersed into molten metal, the ceramic tube 1 is gradually heated until the silica glass tube 2a melts away and when the silica glass tube 2a melts away, ceramic tube 1 is of a considerably high temperature so that the ceramic tube does not rupture by thermal shock.

ONE MODIFICATION

In practical measuring operations, the protecting tube is immersed into molten metal to a depth of from 200 to 300 mm. Therefore, if only the distal portion of the protecting tube which may be from 200 to 300 mm in length from the end, has improved errosion resistance, heat resistance and thermal shock resistance, the measuring operation can be conducted efficiently.

As shown in FIG. 3 this modification is developed on the basis of the above concept wherein the improvement is characterized in that a both-ends-opened thermocouple protecting body 5 which is made of heat resistant metal or ceramic, has one open end connected coaxially with the corresponding open end of the thermocouple protecting tube by mortar cement 6.

FIG. 4 and FIG. 5 show other modifications of the protecting tube of this embodiment wherein numeral 7 indicates a supporting tube.

Furthermore for the purpose of proving the advantage of the thermocouple protecting tube of this embodiment, the following experiment has been conducted.

EXPERIMENT

A thermocouple element was disposed within the thermocouple protecting tube which was constructed such that the silica glass tube (outer diameter 17mm, inner diameter 14mm) was formed around the outer periphery of the alumina protecting tube (outer diameter 10mm, inner diameter 5mm) as shown in FIG. 2. Then, the thermocouple protecting tube was directly immersed into molten metal of 1550° C. Four out of five test tubes withstood the measuring for more than 70 minutes. When an alumina protecting tube of the same kind as used in the above experiment, but without the silica glass, was immersed into molten metal of 1550° C, the alumina protecting tube ruptured in about five seconds and measurement became impossible.

The results of the above experiments and similar experiments conducted within molten metal of 1550° C are described hereinafter.

| material of ceramic tube | size of ceramic tube | size of silica glass tube | result |
| --- | --- | --- | --- |
| magnesia | outer diameter 10mm | outer diameter 17mm | 2 out of 5 test tubes withstood the measuring of 70 min. |

| material of ceramic tube | size of ceramic tube | size of silica glass tube | result | |
| --- | --- | --- | --- | --- |
| | inner diameter | inner diameter | | |
| | 5mm | 14mm | | |
| alumina | 10mm | 14mm | 3 | 5 |
| | 5mm | 12mm | | 70 |
| beryllia | 10mm | 17mm | 3 | 5 |
| | 5mm | 14mm | | 70 |
| magnesia-alumina | 10mm | 17mm | 2 | 5 |
| spinel | 5mm | 14mm | | 70 |

Accordingly, the thermocouple protecting tube of this embodiment can withstand the long measuring operation within molten metal whereby the continuous measuring operation can be achieved without preheating of the tube.

SECOND EMBODIMENT

In this embodiment, the thermocouple protecting tube is constructed such that a ceramic tube 1' which has on the outer periphery thereof a refactory powder coated layer 8', is disposed within a metal tube 2' concentrically.

In FIG. 6, numeral 9' indicates a bolt means which passes through metal tube 2' and fastens metal tube 2' to a ceramic tube 1'.

In this embodiment, when the protecting tube has an excessively large diameter and thickness thereof, the ceramic tube may rupture due to thermal stress. Therefore, the thickness and the outer diameter of the ceramic tube should preferably be about 1 mm nd 5 mm respectively.

The thickness of the coating layer should preferably be about 1 mm.

When the metal tube 2' is too thick, the inner platinum element of the thermocouple cannot follow the heating of the metal tube (this implies that the metal tube can not transfer the received heat to the above element quickly when it is too thick.) and when the above thickness is too thin, the original purpose for the metal tube 2' is lost.

Therefore, the thickness of the metal tube 2' is predetermined such that metal tube 2' melts away about ten seconds after the immersion of metal tube 2'.

According to this embodiment, the following advantages can be brought about:

i. When the protecting tube is immersed into the heat molten body, metal tube 2' which forms the outermost layer of the protecting tube is heated and melted, and during the above melting of metal tube 2', ceramic tube 1' is gradually heated so that it does not rupture by thermal shock.

ii. When the protecting tube is merely made of a ceramic tube, the outer periphery thereof being coated with refractory powder, the protecting tube is very fragile and therefore may break off during the immersion operation. In this embodiment, since the outermost layer of the protecting tube is formed by the metal tube, almost all the protecting tubes are prevented from breaking off.

THIRD EMBODIMENT

The above improvement disclosed in the first and second embodiments are considerably successful in view of performance to withstand thermal shock and it is found that the effect is further improved when some clearance or space is disposed between the ceramic tube and the silica glass.

However, the air disposed within the space is rapidly heated and expand when the protecting tube is immersed into molten steel so that the silica glass which usually does not rupture by thermal shock ruptures by the above expansion of the air.

This embodiment relates to a thermocouple protecting tube which resolves the above mentioned problems and is characterized in that the silica tube is concentrically disposed over the ceramic tube which is made of alumina, beryllia, magnesia or spinel, and they are fastened at their top ends by mortar cement. A desired number of air leaking openings, which communicate between the tubes to the atomosphere, are formed in the outer periphery of the tube body or in the mortar in a lengthwise direction.

The construction and the effect of the thermocouple protecting tubes of this embodiment are described hereinafter in detail and in conjunction with the attached drawings.

As shown in FIG. 7, the previouly mentioned thermocouple protecting tube is constructed such that ceramic tube 1" and silica tube 2" are connected at the top ends thereof by mortar cement 6" and the mortar cement 6" is covered by an outer protective metal pipe 11". However there are no air leakage openings 10" as shown in FIG. 8.

When the above protecting tube is directly immersed into molten metal of a high temperature, the air disposed in the space between ceramic tube 1" and silica glass tube 2" rapidly expands so that the tube may rupture.

In the case of a protecting tube as shown in FIG. 9 which is provided with air leakage opening 10" formed in ceramic tube 1", the expanded air leaks through these apertures to the atmosphere so that the rupture of silica glass tube 2" does not occur.

In FIG. 10, as described previously, the protecting tube is provided with a number of air leakage openings 10" formed in mortar cement 6" in a lengthwise direction. The same effect and advantage can be obtained as that of the above disclosed two types of protecting tubes of this embodiment.

According to this embodiment, as has been described heretofore, the defects of using ceramic such as alumina, beryllia, magnesia, or spinel as the material of the thermocouple protecting tube, which have high heat resistance and high errosion resistance, but which rupture when directly immersed into molten metal, are avoided by disposing the above tube concentrically within silica glass tube 2" which has high thermal shock resistance.

Furthermore, the thermocouple protecting tube is provided with a desired number of air leakage openings 10" which allow the expanded air within the space between ceramic tube 1" and silica glass tube 2" to escape so that silica glass tube 2" is prevented from rupturing and can absorb thermal shock whereby the life of the thermocouple protecting tube is greatly improved.

FOURTH EMBODIMENT

This embodiment relates to a ceramic thermocouple protecting tube which is constructed such that a mixed body composed of a high refractory powder of 100 parts by weight and aluminium phosphate of from 7 to 200 parts by weight, is coated around the outer periphery of a ceramic thermocouple protecting tube.

In FIG. 11 of the drawings, numeral 1''' indicates a ceramic thermocouple protecting body and numeral 2''' indicates an outer coating layer. High resistant refractories such as $Al_2O_3$, $SiO_2$, CaO, MgO, BN, AlN, $Si_3N_4$ and carbon can be considered as material for outer coating layer 2'''.

The above coating layer 2''' is obtained such that the above mentioned mixed body is first coated onto the outer surface of the ceramic thermocouple protecting tube 1''' and is then fired at about 650° C for about 30 minutes.

The inventor has conducted an experiment on the characterisitics or performance of the thermocouple protecting tube of this embodiment which is described hereinafter in great detail.

A mixed body composed of $TiO_2$ and aluminum phosphate was coated 1.0mm thick onto the outer surface of an alumina protecting tube 1''' which had a diameter of 5mm and a thickness of 1.0mm.

The thus fired protecting tube was immersed into molten steel of 1500° C. After soaking for 30 minutes, the protecting tube was lifted from the molten steel and was checked to ascertain whether or not the tube was reusable. The following chart shows the results:

| TiO amount | Aluminum Phosphate amount | ratio of reusable tube (%) |
| --- | --- | --- |
| 100 | 5 | 20 |
| 100 | 7 | 50 |
| 100 | 20 | 60 |
| 100 | 60 | 80 |
| 100 | 80 | 70 |
| 100 | 100 | 90 |
| 100 | 150 | 70 |
| 100 | 200 | 70 |
| 100 | 250 | 50 |
| 100 | 300 | 0 |

It can be observed clearly from the above results that when aluminum phosphate of less than 7 parts by weight relative to the refractory of 100 parts by weight was used, the rupture ratio increases.

This seems to imply that aluminum phosphate, which works as a binder, was not sufficient in quantity.

It was also clearly observed that when the aluminum phosphate was more than 200 parts by weight relative to the refractory of 100 parts by weight, the rupture rate also increased.

This can be construed as indicating that, since the refractory powder, which absorbs thermal shock, is lacking, heat is actively transferred through the aluminum phosphate, resulting in the increased rupture of the protecting tube.

In this way, when aluminum phosphate is added, the thermal shock resistance of the protecting tube is improved. It is estimated that aluminum phosphate releases gas by the firing thereof and becomes porous in structure so that when the tube is rapidly heated, the above porous structure acts in such a way so as to absorb thermal shock.

In the above experiment, the thermocouple protecting tube shares the same temperatures as that of molten steel about 30 seconds after being immersed into the molten steel.

In view of the above results, the thermocouple protecting tube of this embodiment can withstand measuring within molten metal for many hours.

What is claimed is:

1. A thermocouple protecting tube comprising an inner ceramic tube having one end closed and containing a thermocouple element therein, and a thermal-shock resistant outer means disposed concentrically over said inner ceramic tube and over said one closed end of said inner tube, said outer means being a mixed body of high refractory powder of 100 parts by weight and aluminum phosphate of 7 to 200 parts by weight.

2. A thermocouple protecting tube comprising an inner ceramic tube having one end closed and containing a thermocouple element therein, an outer thermal-shock resistant tube having one end closed and disposed concentrically over said inner ceramic tube, said outer tube being spaced from said inner tube, said inner and outer tubes having open ends connected by motar cement disposed between said inner and outer tubes, and air release passages in said motar cement providing for air to escape from the space between said inner and outer tubes.

3. A thermocouple protecting tube comprising an inner ceramic tube having one end closed and containing a thermocouple element therein, an outer thermal-shock resistant tube having one end closed and disposed concentrically over said inner ceramic tube, said outer tube being spaced from said inner tube, said inner and outer tubes having open ends connected by connecting means disposed between said inner and outer tubes, said inner tube having air leakage openings providing for air to escape into said inner tube from the space between said inner and outer tubes.

4. A thermocouple protecting tube comprising an inner ceramic tube having one end closed and containing a thermocouple element therein, said ceramic tube being made of a material selected from the group consisting of alumina, beryllia, magnesia, magnesia-alumina spinel and cermet, and a thermal-shock resistant outer means disposed concentrically over said inner ceramic tube and over said one closed end of said inner ceramic tube, said outer means being made of silica glass.

5. A thermocouple protecting tube according to claim 4 wherein said outer means is an outer tube disposed about and spaced from said inner tube.

* * * * *